(12) United States Patent
Wilczek et al.

(10) Patent No.: US 7,212,914 B2
(45) Date of Patent: May 1, 2007

(54) FLOOR PEDAL WITH A ROTATION ANGLE SENSOR

(75) Inventors: Klaus Wilczek, Werne (DE); Guenther Abdinghoff, Ascheberg (DE); Christophe Henriet, Bousval (BE)

(73) Assignees: AB Elektronik GmbH, Werne (DE); Mobile Control Systems S.A., Brussels (BE)

( * ) Notice: Subject to any disclaimer, the term of this patent is extended or adjusted under 35 U.S.C. 154(b) by 49 days.

(21) Appl. No.: 10/529,588

(22) PCT Filed: Oct. 2, 2003

(86) PCT No.: PCT/EP03/10962

§ 371 (c)(1),
(2), (4) Date: Mar. 29, 2005

(87) PCT Pub. No.: WO2004/033878

PCT Pub. Date: Apr. 22, 2004

(65) Prior Publication Data

US 2005/0268741 A1    Dec. 8, 2005

(30) Foreign Application Priority Data

Oct. 2, 2002   (DE) ................... 102 45 926

(51) Int. Cl.
*G06G 7/70*    (2006.01)
*F02D 11/10*   (2006.01)
*G05G 1/14*    (2006.01)

(52) U.S. Cl. ................ 701/115; 123/399; 74/513

(58) Field of Classification Search ........... 123/399, 123/400, 361; 74/512, 513, 514, 560, 561; 701/115, 110; 180/335
See application file for complete search history.

(56) References Cited

U.S. PATENT DOCUMENTS

| | | | | |
|---|---|---|---|---|
| 4,519,361 A | * | 5/1985 | Murakami | 123/399 |
| 4,831,985 A | * | 5/1989 | Mabee et al. | 123/399 |
| 4,919,097 A | * | 4/1990 | Mitui et al. | 123/399 |
| 4,958,607 A | * | 9/1990 | Lundberg | 123/399 |
| 5,241,936 A | * | 9/1993 | Byler et al. | 123/399 |
| 6,237,565 B1 | * | 5/2001 | Engelgau | 123/399 |
| 6,373,241 B1 | | 4/2002 | Weber et al. | |

(Continued)

FOREIGN PATENT DOCUMENTS

DE        43 17 259       5/1993

(Continued)

*Primary Examiner*—Stephen K. Cronin
*Assistant Examiner*—Johnny H. Hoang
(74) *Attorney, Agent, or Firm*—Milde & Hoffberg, LLP

(57) ABSTRACT

A pedal element (2) with a connecting device (5, 7, 8, 9, 10, 11, 12, 13, 15, 16) can be moved between an idle position and a full-throttle position of an internal combustion engine at a pedal angle ranging between 0° and 5° to 30°. A signal-generating device is configured in the form of a rotation angle sensor (1) having at least one integrated circuit (ASIC) with a Hall device. The ASIC with the Hall device and a storage device with an ASIC are connected to a microprocessor. An output switching unit is connected downstream from the microprocessor. The output switching unit emits an pulse-width-modulated signal with selectable frequencies. Other output signals, such as back-to-back signals and switch signals, can be regenerated with the ASIC with the Hall device and the microprocessor.

40 Claims, 10 Drawing Sheets

U.S. PATENT DOCUMENTS 6,426,619 B1 * 7/2002 Pfaffenberger et al. .. 324/207.2
6,651,524 B2 * 11/2003 Dawson et al. ............... 74/513

FOREIGN PATENT DOCUMENTS

| | | |
|---|---|---|
| DE | 105 20 299 | 6/1995 |
| DE | 195 03 335 | 12/1995 |
| DE | 196 47 897 | 11/1996 |
| DE | 197 16 985 | 4/1997 |
| DE | 100 46 584 | 9/2000 |
| DE | 101 33 542 | 7/2001 |
| EP | 0 416 039 | 5/1989 |
| EP | 1 055 912 | 5/2000 |
| EP | 1 111 343 | 12/2000 |
| WO | WO 99/28469 | 6/1999 |

* cited by examiner

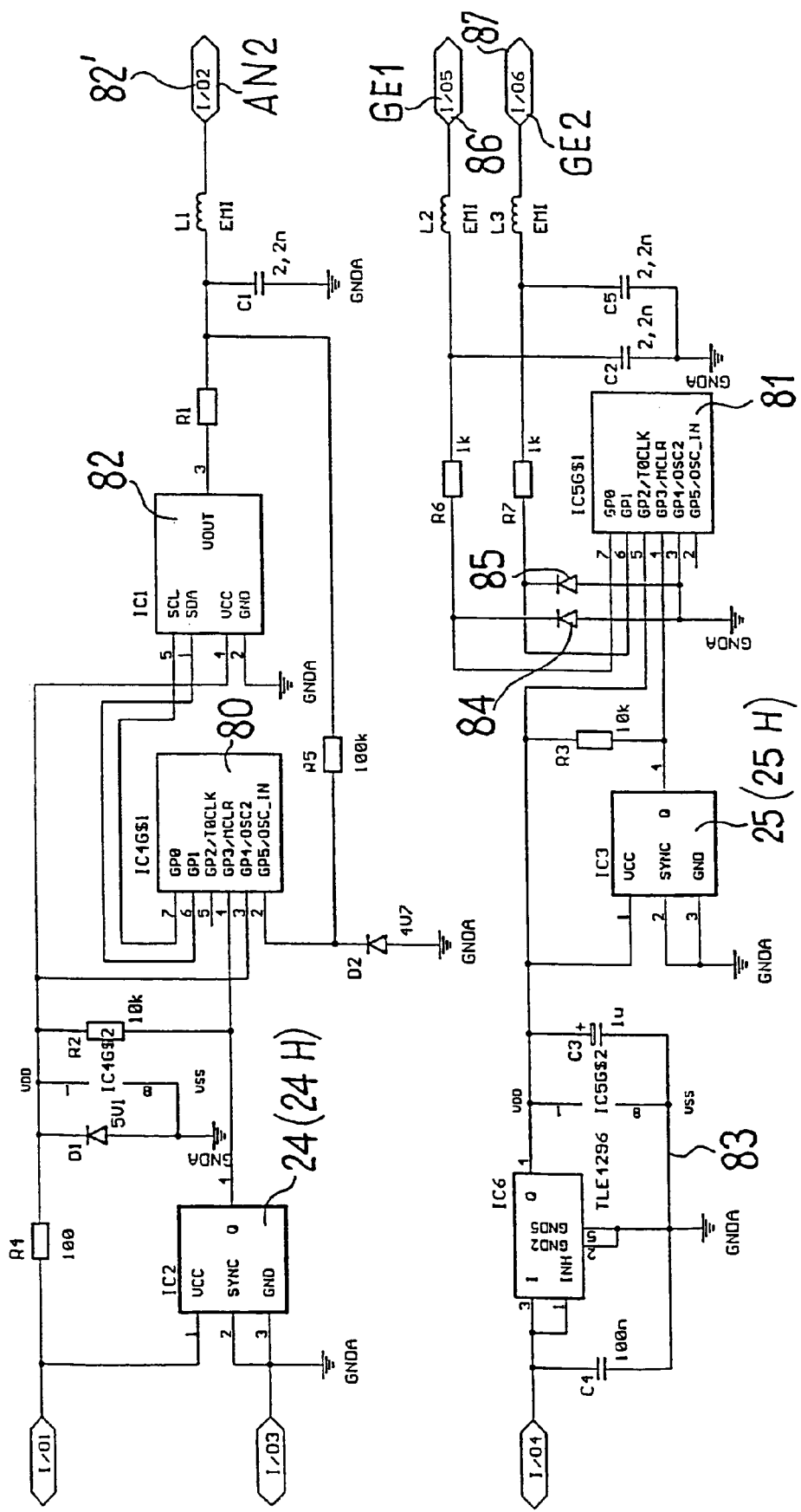

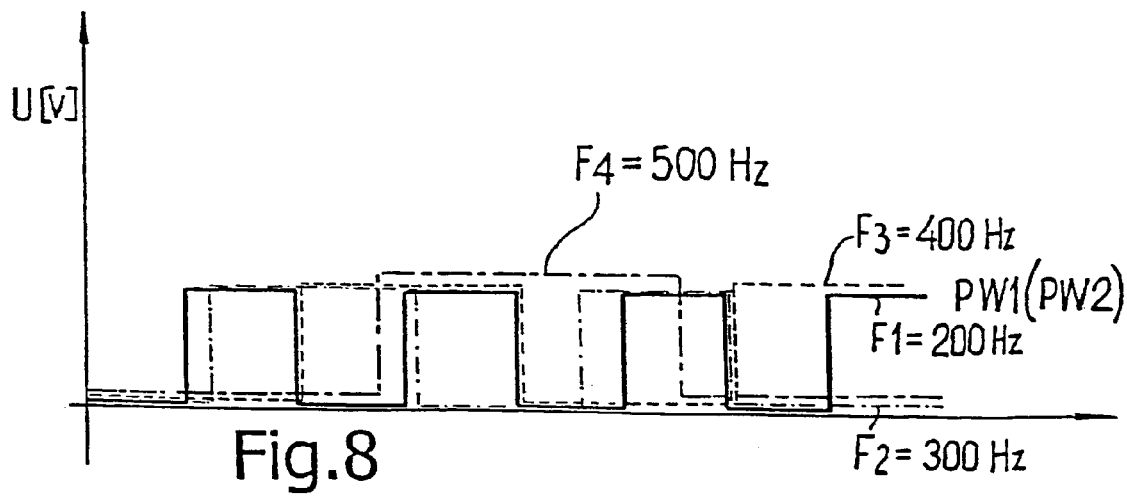
Fig. 8
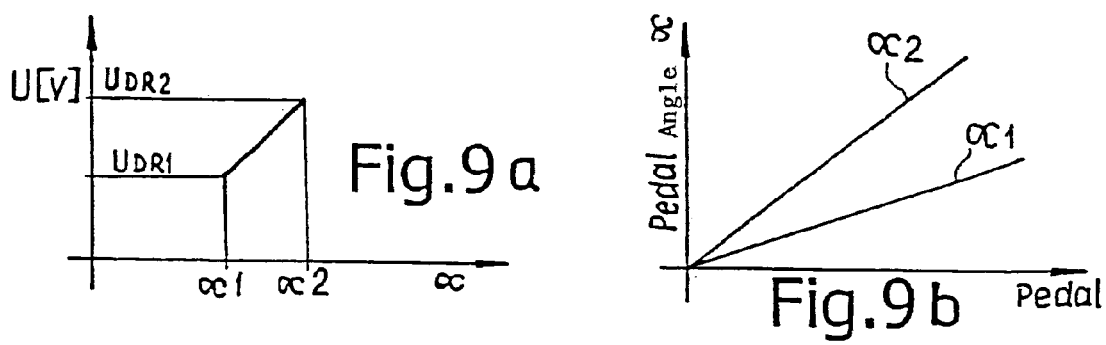
Fig. 9a
Fig. 9b
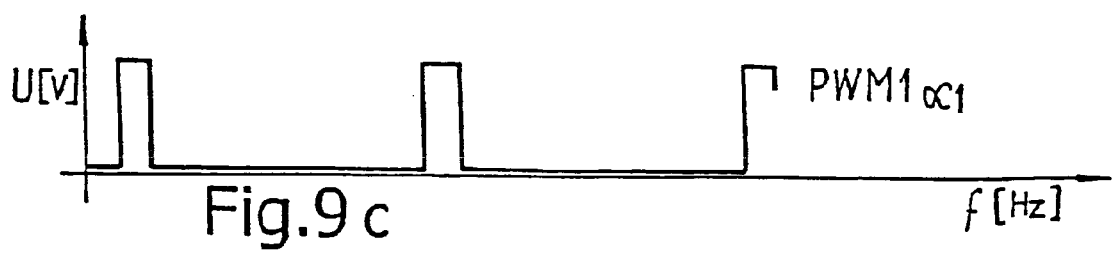
Fig. 9c
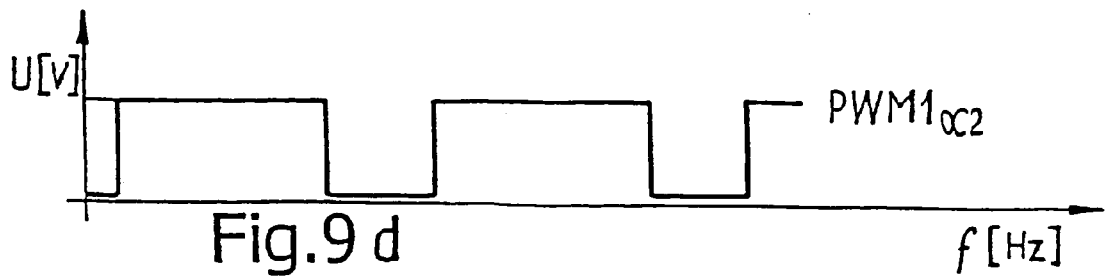
Fig. 9d

FLOOR PEDAL WITH A ROTATION ANGLE SENSOR

BACKGROUND OF THE INVENTION

The invention relates to a floor pedal device for heavy motor vehicles, more particularly trucks, buses, mobile cranes, and the like that includes at least
- a pedal element and
- a base plate element that are connected to each other by means of a connector device; and
- a signal generator device that is at least partially connected with the connector device and by means of which a signal is generated via movement of the pedal element.

The signal generator device makes use of a rotational-angle sensor that includes at least one Application Specific Integrated Circuit (ASIC) with a Hall-effect that produces an ASIC output voltage with a linear section for a floor pedal device.

The pedal element in the floor pedal device may be moved between an idle position and a full-throttle position of an internal combustion engine to create a signal corresponding to the movement of the pedal element.

A floor pedal device of the above-mentioned type is known from EP 0 416 039 B2. It includes a pedal element and a floor element that are connected with each other so that they may move. A potentiometer is provided that recognizes the relative movement between the pedal element and the floor element and delivers a pulse width modulated signal corresponding to the position of the pedal element.

The disadvantage is that, with the known device, only a single pulse-width-modulated signal is created. Thus, the device may be used only for one application. Since a long resistance path is necessary to produce the potentiometer signal and to create an pulse-width-modulated signal, an intermediate mechanical element is required.

A gas pedal device is known from DE 195 03 335 A1 that consists of a pedal element and a base plate that are movably connected with each other. A motion-sensor element with a stationary and a mobile unit is positioned at the gas-pedal pivot axis. For this, the stationary unit within the gas pedal pivot axis is fixed and the moving part is connected to the pedal element. In order to prevent damage to the sensor element by excessive pedal movement, the known gas-pedal device is constructed as a motion-limiting actuation unit.

A motion-sensor element designated as a rotational-angle sensor is known from WO 95 14 911 A1. It consists of a stationary and a rotating formation. The stationary formation includes two half-moon-shaped stator elements between which a separating recess is located in which a Hall-effect is positioned. The rotating formation includes a ring-shaped magnetic element held by a securing unit, and it is moveable about the stator elements with an air gap.

This rotational-angle sensor has proven itself. However, its design is not limited to use in a floor pedal device for heavy vehicles, particularly for trucks, buses, mobile cranes, etc.

Such a rotational-angle sensor is also known from the following publications: WO 98 25 102 A1, DE 197 16 985 A1, DE 199 03 490 A1, and EP 1 024 267 A2.

SUMMARY OF THE INVENTION

It is the object of the invention further to simplify signal generation in a floor pedal device for heavy vehicles, particularly for trucks, buses, mobile cranes, etc. and to make signal generation useable for more than one application.

The advantages achieved by the invention particularly consist of the fact that the properties of the sensor may be simply and accurately adapted to the vehicle characteristics. This makes the pedal useful for heavy vehicles.

In a first embodiment of the invention, the ASIC circuit with the Hall-effect and connected units is used for the creation of a pulse-width-modulated signal. The pulse-width-modulated signal is issued at selectable frequencies. This allows use of such a floor pedal device in heavy vehicles in Europe, the U.S., etc. without requiring special preparations. Not only an IC with a Hall-effect device, but rather up to eight ASIC circuits may be installed, each with its own Hall-effect device. This makes it possible to create, for example, eight independent pulse-width-modulated signals with corresponding selectable frequencies.

In a second embodiment of the invention, the ASIC circuit with the Hall-effect device and the connected components are used to create an analog signal. It is possible here also to configure the rotational-angle sensor so that it contains eight ASIC circuits with the pertinent Hall-effect devices so that several, e.g., eight, analog signals may be generated.

In a third embodiment of the invention, the ASIC circuit with the Hall-effect device and the connected components are used to create a switching signal. Here also, the use of several ASIC circuits with the pertinent Hall-effect devices allows the option of producing several, e.g., eight, independent signals.

In a fourth embodiment of the invention, the ASIC circuit with the Hall-effect device and the connected components are used to create balanced switching signals. Several signals, e.g., up to eight ASIC circuits with their Hall-effect devices allow the option of creating eight independent balanced switching signals.

In this case, the advantages consist particularly of the fact that off-the-shelf rotational-angle sensors are used. This avoids additional cost for special production runs and the like. The rotational-angle sensors are eminently suited to recognize very small pedal angles.

In a fifth embodiment of the invention, the ASIC circuit with the Hall-effect device and the connected components are used to produce two pulse-width-modulated signals with selectable frequencies via two channels. These independent pulse-width-modulated signals may each be fed to a motor control circuit and independently evaluated.

In a, sixth embodiment of the invention, the ASIC circuit with the Hall-effect device and the connected components are used to create a first analog signal from one channel and a switching signal from a second channel. These two signals are fed to the motor control unit and processed accordingly.

In a seventh embodiment of the invention, the two ASIC circuits, each with the Hall-effect device and the connected components are used to produce a second analog signal from the one channel, and to produce balanced signals from the other channel.

The pedal element may be moved through an angle of between 0° and 22° in the connector device between the idle and full-throttle position. This pedal angle joint corresponds approximately to the movement travel of a foot on the ankle in order to exert sufficient force to depress the gas pedal.

The connector device includes, along with at least one return spring to return the pedal element to the idle position, a separate sensor return spring to restore the rotational-angle sensor to the zero position. Two return springs are used, as safety regulations prescribe. The separate return spring is of special significance. The rough operation of a heavy vehicle allows the possibility that the sensor element may separate from the pedal element, in which case it is no longer possible to return the sensor element to the zero position via the two return springs and the connector device. If the sensor return spring did not exist, the corresponding output signals such as PWM (pulse-width-modulated) signals, analog signals, switching signals, and the like would be produced with the same signal magnitudes as existed for the last pedal position. This could cause poor control of the internal combustion engine, resulting in an accident. Such negative consequences are greatly hindered by separate return springs.

The selectable frequencies of each pulse-width-modulated signal may be programmed via each buffer unit. Programmability allows suitable resetting in the field. In this manner, the pedal device may be mass produced very inexpensively, independent of the individual application.

Each ASIC circuit is programmable by a microprocessor with a storage unit via flat terminals of the encapsulated rotational-angle sensor. This programmability within the encapsulated rotational-angle sensor has the advantage that the linear section of the ASIC output voltage may be adjusted as to linearity and slope and other data.

Even the microprocessor units used with each associated buffer storage unit may be programmed via the flat terminals of the encapsulated rotation angle sensor. This avoids the necessity of opening the housing to reprogram.

The circuit buffer units of each ASIC circuit, the storage buffer unit, the first buffer unit and the second buffer unit may all be implemented as an $E^2PROM$. An $E^2PROM$ is fixed-value buffer that may be used as read-write memory. This allows the data stored in the $E^2PROM$ to be updated or altered.

When in the idle position, the pedal element may be disposed at a "floor angle" with respect to the base plate element in the idle position. The floor angle minus the pedal angle may be equal to a final-position angle. The floor angle may be 30°, 35°, or 40°, and the final-position angle may be 8°, 13°, or 18°, so that the prescribed pedal angle of 22° results. This allows for the pedal move easily through the pedal angle above the floor.

The advantages from the invention arising consist particularly of the fact that a normal rotational-angle sensor with two ASIC circuits and an associated Hall-effect device are used to produce the output signals. The two channels may be used either for the production of pulse-width-modulated signals with selectable frequencies via two channels, or for the production of an analog signal, or for the production of a switching signal or balanced signals. The two-channel feature allows the signals produced to be mixed depending on application requirements.

Like the ASIC circuits with Hall-effect devices, the additional components may be encapsulated within a housing of the rotational-angle sensor. This protects them against the environment.

For a full understanding of the present invention, reference should now be made to the following detailed description of the preferred embodiments of the invention as illustrated in the accompanying drawings.

BRIEF DESCRIPTION OF THE DRAWINGS

FIG. 6b shows a circuit diagram with one channel of an analog signal generator per FIG. 5a or 5b, and an additional channel of a push-pull signal generator per FIG. 6a that are mounted within the housing of a rotational-angle sensor per FIGS. 1 through 3.

FIG. 8 shows pulse-width-modulated signals emitted from the two channels of a pulse width arrangement according to FIG. 4b.

FIG. 9a–d shows a representation of the individual steps to create a pulse-width-modulated signal in dependence upon on the pedal position.

DESCRIPTION OF THE PREFERRED EMBODIMENTS

Figure 1:
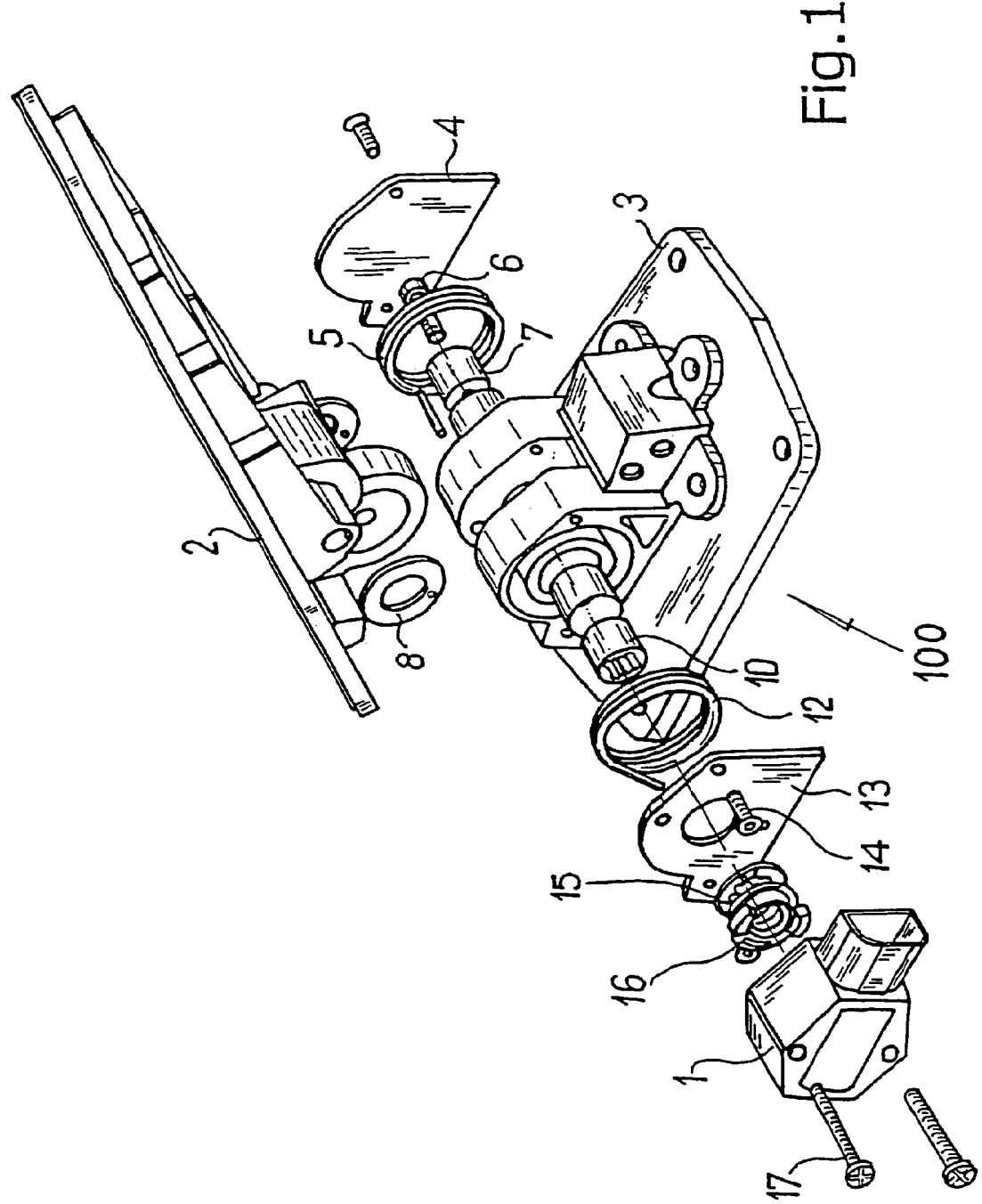
FIG. 1 shows a floor pedal with a rotational-angle sensor in exploded, perspective, schematic view.

The preferred embodiments of the present invention will now be described with reference to FIGS. 1–11 of the drawings. Identical elements in the figures are designated with the same reference numerals.

Figure 2:
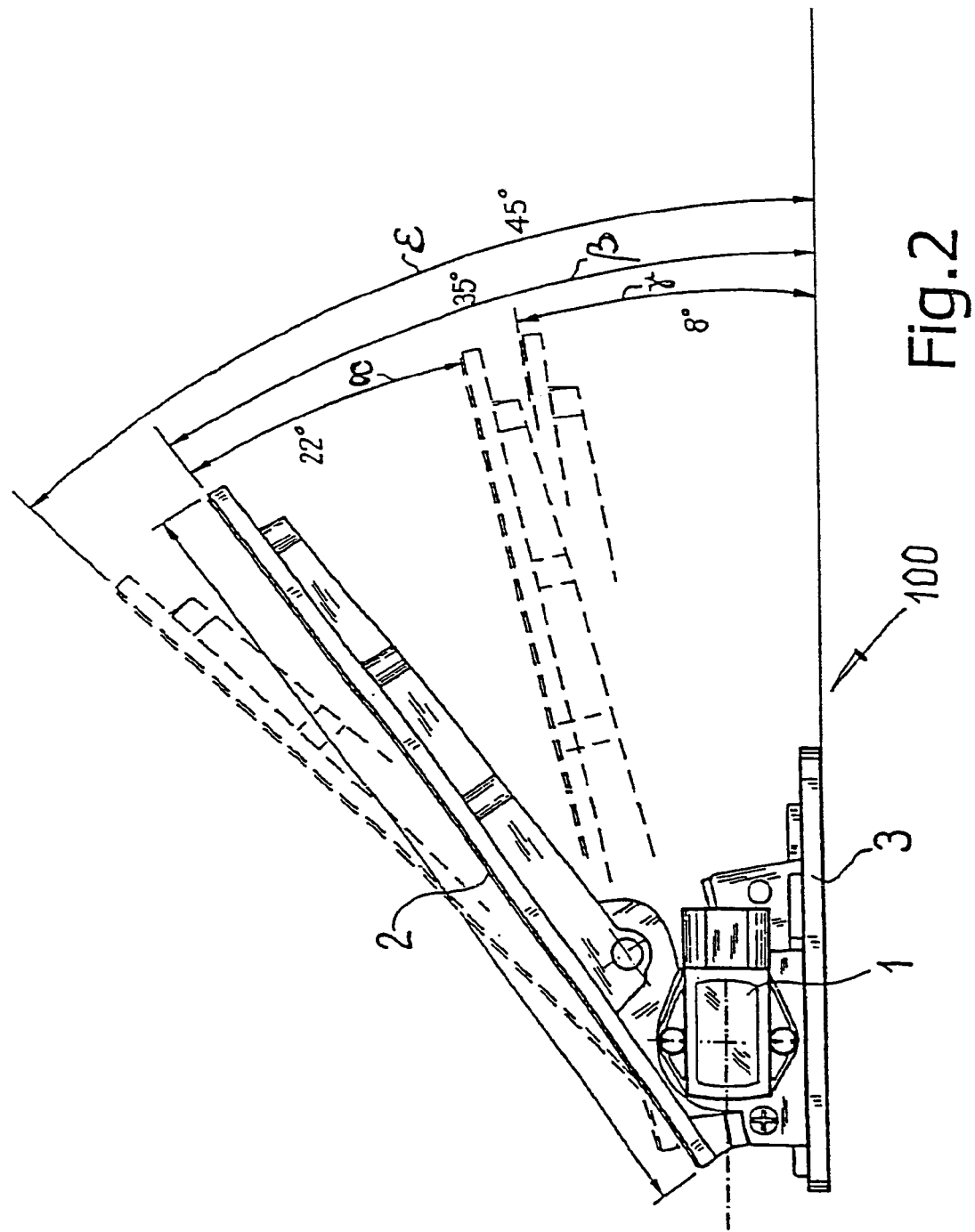
FIG. 2 shows a floor pedal with a rotational-angle sensor as in FIG. 1 in a schematically illustrated side view.

FIGS. 1 and 2 show a floor pedal 100. It includes a base plate element 3 that is secured to the floor of a heavy vehicle, such as a truck or bus for example.

The base plate element 3 is connected to a pedal element 2 via a connector device. A rotational-angle sensor 1 is flange-mounted to the connector device.

As FIG. 1 particularly shows, the connector device consists of a left axis element 7 and a right axis element 10, between which a cylindrical bearing is located. A return-spring element 5 is positioned around the one side, and a return-spring element 12 is positioned on the other. A screw 6 holds the axis elements together, and a screw 14 holds the remaining parts together.

The left axis element 7 is screwed with screws to a housing surrounding the axis element by means of a cover plate 4. The housing is enclosed at the right axis element 10 by means of a sensor mounting plate 13.

The sensor mounting plate 13 includes a recess through which the rotational-angle sensor 1 may be connected with the right axis element 11. A specially shaped axial sensor adapter 16 is used for this. Screws 17 affix the rotational-angle sensor 1 to the sensor mounting plate 13.

Of note is the fact that the rotational-angle sensor includes a separate sensor return-spring element 15. The sensor return-spring element 15 ensures that, in case the shaft shears or the rotational-angle sensor 1 is sheared off, the rotational-angle sensor 1 is returned to its zero setting so that operating dangers, engine damage, and the like may be avoided.

FIG. 2 shows the angles through which the pedal element 2 may be moved with respect to the base plate element 3.

In a minimal idle position at a 45° implementation, the pedal element 2 creates an idle angle γ of 45° with respect to the base plate element 3.

In the otherwise normal idle position, the floor angle β is 35°. The actual pedal angle α that is preferably used is 22°. This makes it possible for the operator's foot to operate the pedal element 2 for a long time without exhaustion.

It is also possible that, during a necessary maximum full-throttle position at a 30° implementation of the pedal element with respect to the base plate element results in a final-position angle γ of only 8°. The extreme positions—minimal idle position and maximum full-throttle position—increase the possible pedal actuation angle by several degrees.

Figure 3:
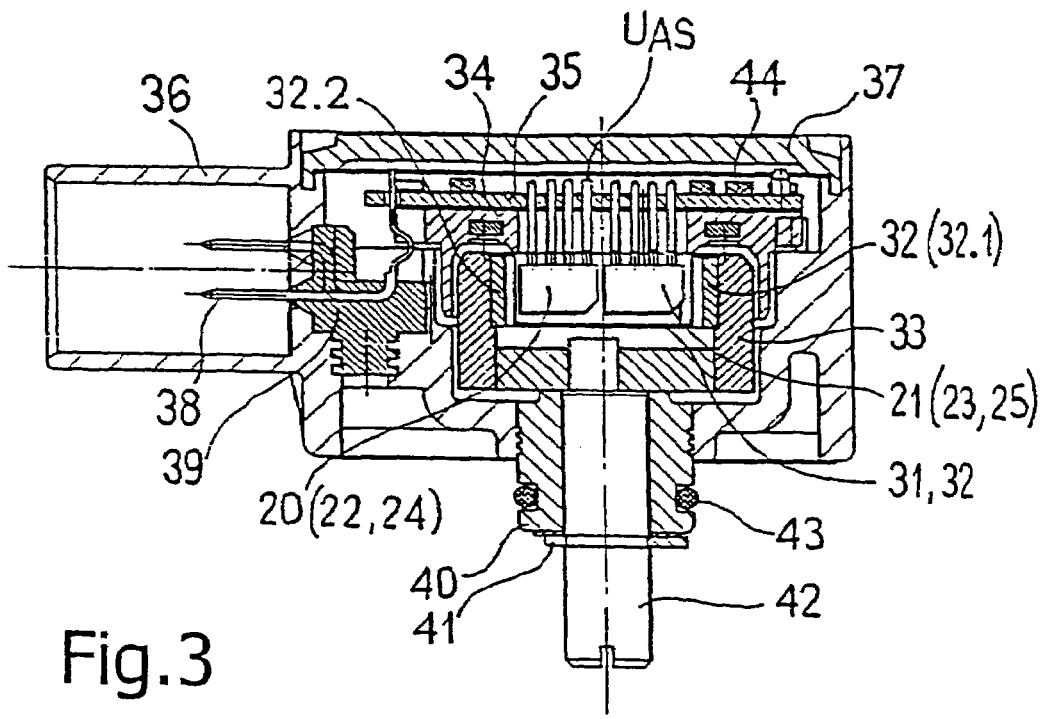
FIG. 3 shows a rotational-angle sensor per FIGS. 1 and 2 in schematic cutaway view.

FIG. 3 shows the rotational-angle sensor 1.

A ring magnet 32 rotates about two wedge-shaped disks 30, 31 separated from each other at a specific distance. The ring magnet 32 is held within a ring-magnet recess 33. A shaft 42 is connected with the ring-magnet recess. The shaft moves within a bushing 40 secured by means of a security ring 41 about which an O-ring 43 is positioned that is.

Two ASIC circuits 20 and 21, 22 and 23, 24 and 25 are positioned in the separation recess between the two flow guides 30, 31. Each ASIC includes a Hall-effect device 20H and 21H, 22H and 23H, 24H and 25H that collaborate with additional circuit components and are preferably implemented as integrated circuits. The ASIC with the Hall-effect device is enclosed by the ASIC housing.

The flow guides are secured by means of a stator-securing element 35. The ring magnet 32, consisting of two ring elements 32.1, 32.2 with corresponding magnetic poles, rotates under the stator-securing element.

A circuit board 35 is located under the stator-securing element 35 into which the pin connections of the two ASIC circuits are inserted. Additional components 44 are also located on the circuit board 35.

A housing unit consisting of housing 36 and cover 37 encloses the stator and rotor unit. The bushing 40 is held within the housing 36. Moreover, the housing 36 surrounds a flat plug 38 that is held by a plug cartridge 39.

The rotor unit rotates about the stator unit by means of a selecting element 42 through a potential angle of 0 to 360°, and creates an ASIC output voltage $U_{AS}$, which approximates a sine wave. The ASIC output voltage $U_{AS}$ is not completely linear in all ranges. It is possible, however, by using pin programming and one of the pins of the flat plug 38, to increase the ASIC voltage correspondingly making it linear. In particular, it is possible to further make the linear section $U_L$ between the two extreme values and to influence the slope of the linear section. In this linear section the rotational-angle sensor 1 possesses its highest degree of accuracy.

Figure 7:
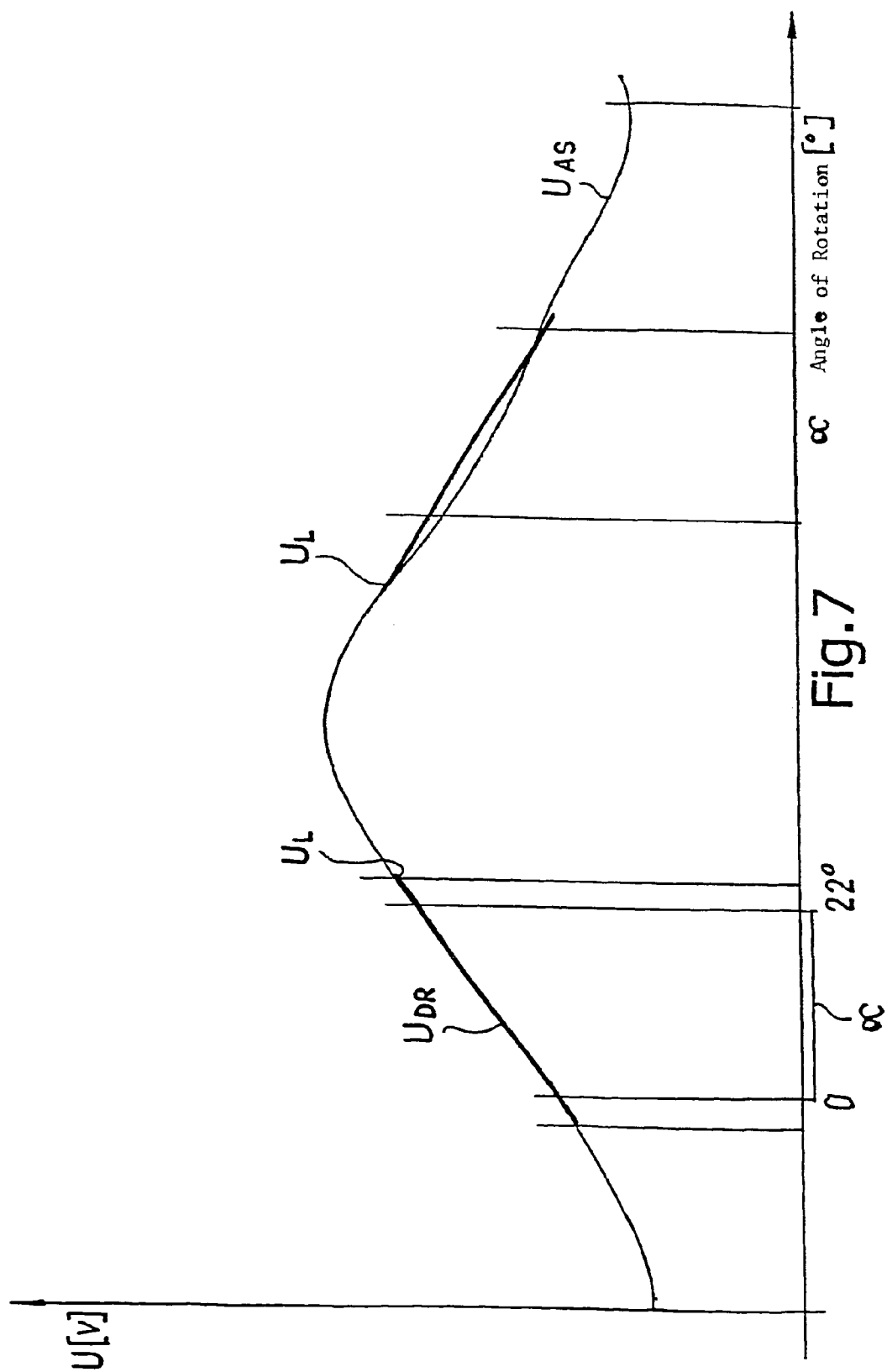
FIG. 7 shows a signal flow chart of a rotational-angle sensor per FIGS. 1 through 3 in dependence upon rotational angle.

It is essential to the invention that the very small pedal angle α of from 0° to 22° lie in this linear section $U_L$, as FIG. 7 shows. Thus the position of the section is freely selectable, and may be displaced to the left or right and both the rising and the falling linear sections of the ASIC output voltage $U_{AS}$ may be used. This offers the particular advantage that an additional rotational-angle sensor may also be installed on the opposing side in the area of the cover plate 7. For this, the cover plate must be shaped similar to the sensor mounting plate.

Figure 4A:
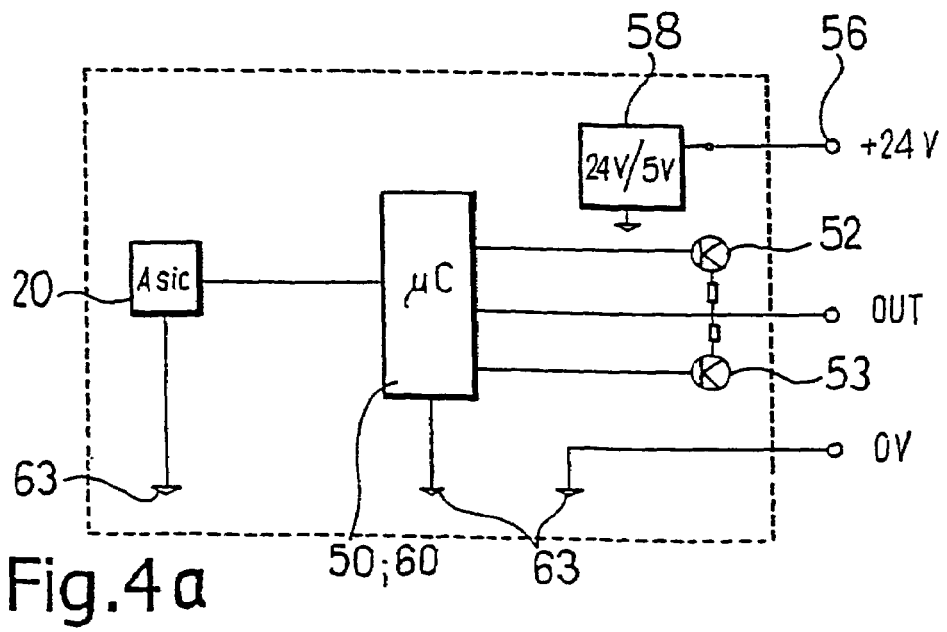
FIG. 4a shows a concept circuit diagram of a pulse-width arrangement with a signal-generating branch.
Figure 4B:
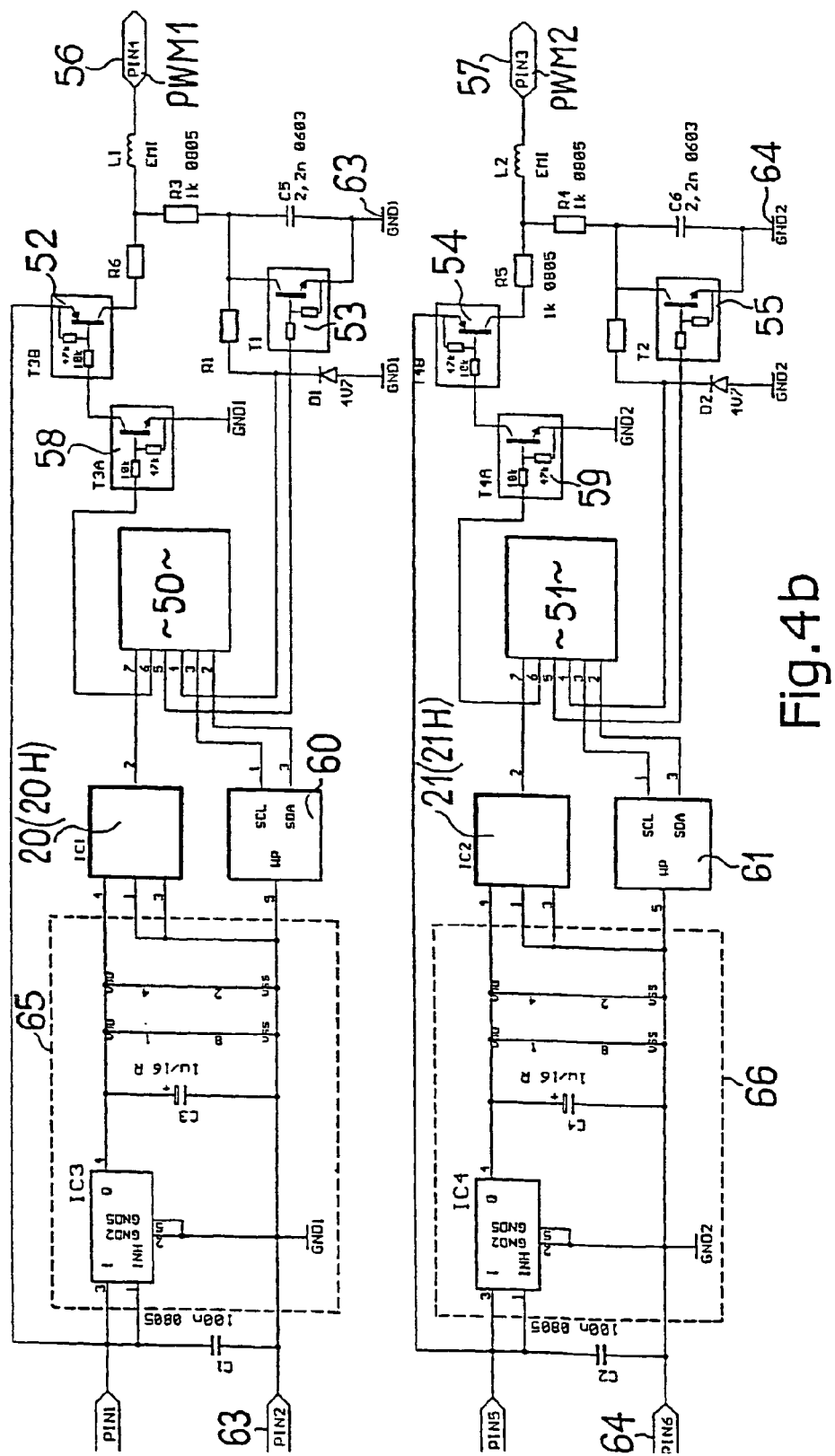
FIG. 4b shows a circuit diagram with two channels of a pulse-width arrangement per FIG. 4a mounted within a housing of a rotational-angle sensor per FIGS. 1 through 3.

As FIGS. 4a and 4b show, a first rotational-angle sensor 1 is used to create a pulse-width modulated signal (PMW signal) through two channels. The first channel is formed by means of the ASIC 20 with the Hall-effect device 20H. For this, the ASIC 20 is connected to a buffer unit 60 with an included microprocessor 50. An input-switching unit 65 is pre-switched to the ASIC 20 and to the buffer unit 60. Pin 1 of the input-switching unit 65 is connected with +24V and Pin 2 is connected with ground 63.

The output 6 of the microprocessor unit 50 is fed to a switching unit 58 that is connected with a signal amplifier unit 52. The signal amplifier unit 52 is connected via a resistor R6 and an inductor L1 to a Pin 4.

The outputs 4 and 5 of the microprocessor unit 50 is fed to a signal reduction unit 53. A capacitor C5 is positioned between both outputs of the signal reduction unit 53 whose one side is connected to ground 63, and whose other side is connected to a resistor R3 and the inductor L1.

A pulse-width-modulated signal is generated at Pin 4, as FIG. 8 shows. A total of four adjustable frequencies F1 through F4 may possess the following values:

F1=215 Hz
F2=300 Hz
F3=400 Hz
F4=500 Hz

It is possible by means of the signal reduction unit to determine the signal level at the output 56 of Pin 4 at 24V, or at the converted level of 5V.

The second ASIC 21 with Hall-effect device 21H is similarly configured as channel 1 described above. A buffer unit 61 is used instead of the buffer unit 60, a microprocessor unit 51 is used instead of the microprocessor unit 50, a switching unit 59 is used instead of the a switching unit 58, a signal amplifier unit 54 is used instead of the signal amplifier unit 52, a signal amplifier unit 55 is used instead of the signal amplifier unit 53. For this, the common connection possesses the index 64. A resistor R5 is used instead of a resistor R6, and an inductance of L3 used instead of an inductance of L1.

An input-switching unit 66 that is connected to a Pin 5 with +24V and to a Pin 6 with ground 64 is used instead of the input-switching unit 65.

A pulse-width-modulated signal PWM2 with varying frequencies F1 through F4 is produced by Pin 57.

The input-switching units 65 and 66 are of identical design. They consist of ASIC 3 or ASIC 4, whose inputs are connected to Pin 1 and Pin 2 and Pin 5 and Pin 6. The output of ASIC 3 or ASIC 4 is fed to the input 4 of the ASIC 20 or ASIC 21.

Pin 2 or Pin 6 is fed to the second and third input 1 or 3 of the ASIC 20 or ASIC 21. Moreover, Pin 3 or Pin 6 is connected to the buffer unit 60 or 61. The connection goes to ground 1 or ground 2, and is also fed to ASIC 3 or ASIC 4. A capacitor 3 or 4 and other adjacent ASIC circuits are positioned in parallel between the parallel connections to input 4 of the two ASIC circuits and the grounded connection leading to input 5 of the buffer units 60, 61.

An overwritable type 24LC010T E$^2$PROM is used as a buffer unit.

A type 12 C 672-04 ISM microprocessor is used as the microprocessor unit.

The individual signal amplification or reduction units are implemented as correspondingly connected transistor amplifier stages.

Zener diodes (Z-diodes) of type 4 V 7 or 4 V 1 are used.

Circuits of type BCR 35 PN are used for the units 52, 54, 58, and 59, and circuits of type BCR 116 are used for the units 53 and 55.

When the pedal is actuated, the linear pedal angle output voltages $U_{DR}$ per FIG. 7 are determined by means of the IC's 20, 21, and are converted into pulse-width-modulated signals per FIG. 8.

It is of special importance that the additional circuits of both channels be positioned on the printed-circuit board 35 of the rotational-angle sensor, and that they be enclosed by the housing unit 36, 37.

How the pulse-width-modulated signal PMW1 is regenerated dependent on the position of the pedal element 2 will be described using FIGS. 9a through 9c.

The pedal-angle initial voltage $U_{DR1}$ per FIG. 9a is produced at a pedal angle α1 per FIG. 9b. This pedal-angle initial voltage $U_{DR1}$ is passed to the microprocessor unit 50 or 51 that, with the help of its programming, produces and issues a pulse-width-modulated signal PWM1 α1 per FIG. 9c.

A pedal-angle initial voltage $U_{DR2}$ per FIG. 9a corresponds to the pedal angle α2 per FIG. 9b. The microprocessor unit creates a pulse-width-modulated signal PWM1 α2 with help from $U_{DR2}$ as shown in FIG. 9d.

It is clear that a specific pulse-width-modulated signal PW 1 corresponds to each pedal angle α. In the same manner, the pulse-width-modulated signals PW2 through PW4 are created at the frequencies F2 through F4 dependent on the pedal angle α.

Figure 5A:
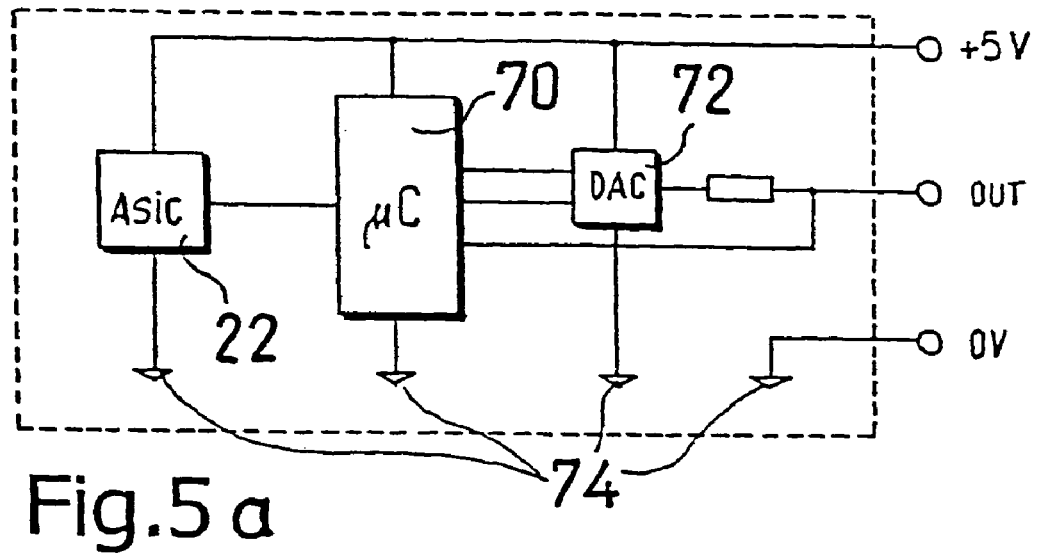
FIG. 5a shows a circuit diagram of a signal-generating branch of an analog, signal generator.
Figure 5B:
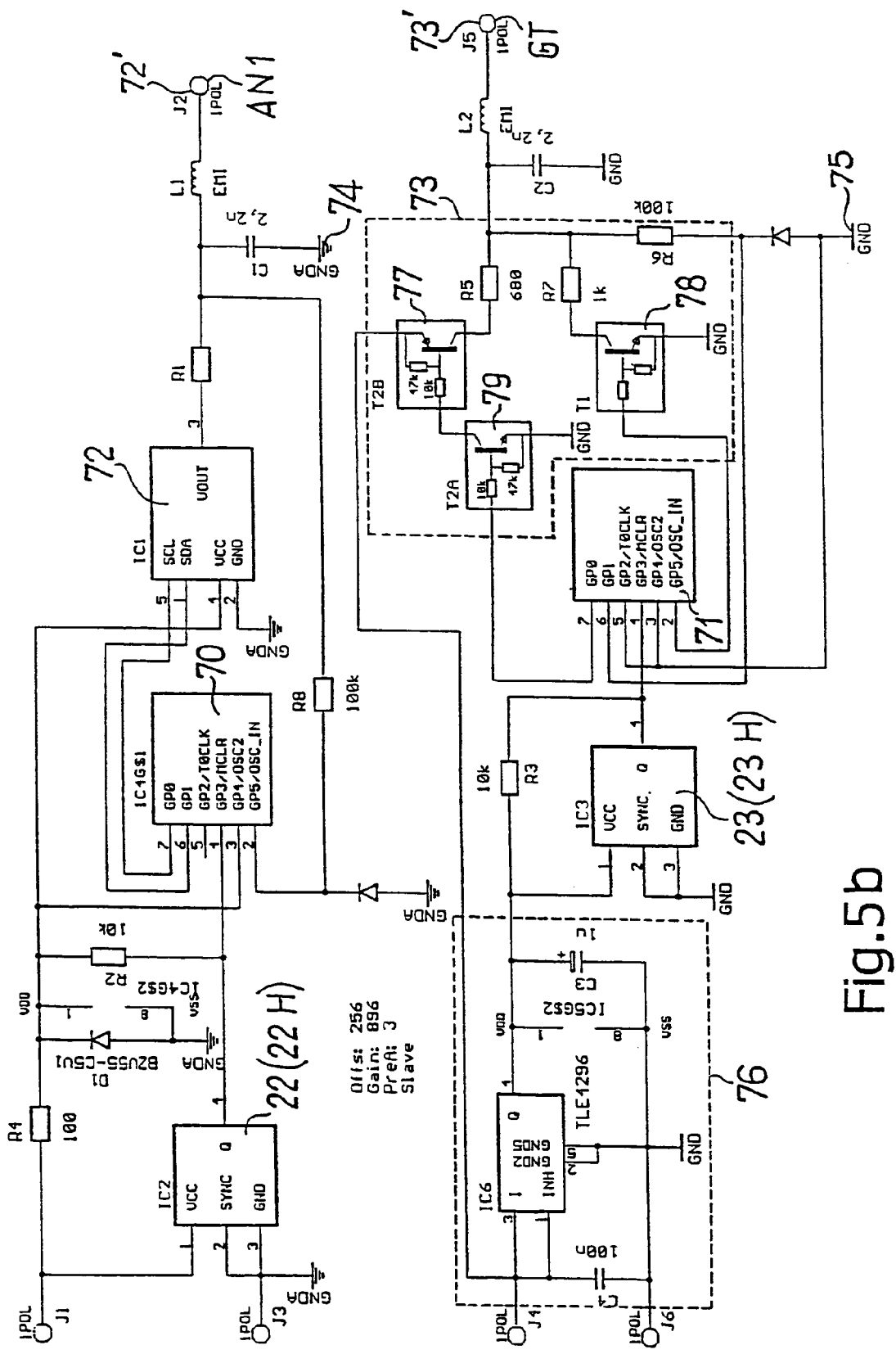
FIG. 5b shows a circuit diagram with one channel of an analog signal generator per FIG. 5a and an additional channel of a push-pull signal generator that are mounted within a housing of a rotational-angle sensor per FIGS. 1 through 3.

FIGS. 5a and 5b show another circuit option of the two IC's present within the rotational-angle sensor.

Here, the ASIC 22 with Hall-effect device 22H is connected with the input 4 of a microprocessor unit 70.

The outputs 6 and 7 of the microprocessor unit 70 are fed to the inputs 1 and 5 of an analog/digital converter 72. The output 3 of the A/D converter 72 is fed via a resistor R1 and an inductor L1 to the junction J2 of an output 72; an analog signal AN1 is present at output 72'.

The input of a terminal J1 leads both to the input 1 of the ASIC 22 and via a resistor RF4 to the input 3 of the microprocessor unit 3, and to the input 4 of the A/D converter 72. A type BZU 55-C 5V 1 diode D1 is positioned between the resistor R4 and ground. A resistor R2 is connected in parallel to D1 that is connected to the terminal line J1 and to the output line of the ASIC 22.

Further, the inputs 2 and 3 of ASIC 22 are connected to the terminal J3 input. Both inputs are grounded.

The input 2 of the microprocessor unit 70 is fed to a diode 2 that is grounded. The diode output is fed via a resistor R8 to the resistor R1.

The input of the second ASIC 23 with its Hall-effect device 23H is connected with the input-switching unit 76. The output 4 of the ASIC 23 is connected with the input 4 of a microprocessor unit 71. The outputs of the microprocessor unit 71 are connected with a push-pull stage 73 that produces a push-pull signal GT at the output 73' of the terminal J5.

The input-switching unit consists of an ASIC 6 whose outputs 2 and 5 are grounded. Its inputs 1 and 3 are fed to terminal J4. A capacitor C4 is positioned between the terminal J6 and the input 1 of the ASIC 6. The ASIC 6 is of type TLE 4296. A circuit ASIC 5G52 is positioned between the output 4 and the connection to ground from terminal J6 to which a capacitor C2 is placed in parallel.

The output 1 of the ASIC 23 is connected with the connection between the output 4 of the ASIC 23 and the input 4 of the microprocessor unit 71 via a 10 kΩ resistor 3.

The push-pull stage 73 consists of a switching unit 79 that is connected with a signal amplification unit 77. The switching unit 79 is connected with the output of the microprocessor unit 71. The push-pull stage also includes a signal reduction unit 73 that is connected with the output 2 of the microprocessor unit 71. The output of the signal-amplifying unit 77 is connected with the induction L2 via a resistor R5, and the signal-amplification unit 78 is connected with the induction L2 via a resistor R7. A grounded capacitor C2 is placed in front of this inductor. The resistor R7 moreover is connected with a resistor R3, to which a type PZV55-C5V1 rectifier stage D3 is assigned. The output 6 of the microprocessor unit 71 is connected between the resistor R6 and the diode D3. The inputs 3 and 5 of the microprocessor unit 71 are grounded between the diode D3 and the ground point 75.

Figure 10:
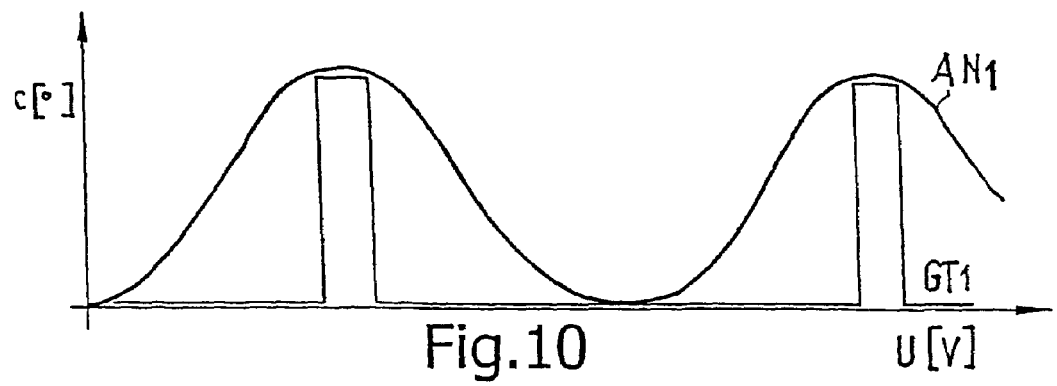
FIG. 10 shows a switching signal produced by the push-pull signal generator per FIG. 5b.

If the pedal element 3 is moved by pedal angle α, the analog signal AN1 shown in FIG. 10 is present at output 72', and the switching signal GT1 is present at output 73'.

It is also advantageous here that the components mentioned are mounted on the printed-circuit board 35 of the rotational-angle sensor as extra components 44, and are enclosed by the housing unit.

Figure 6A:
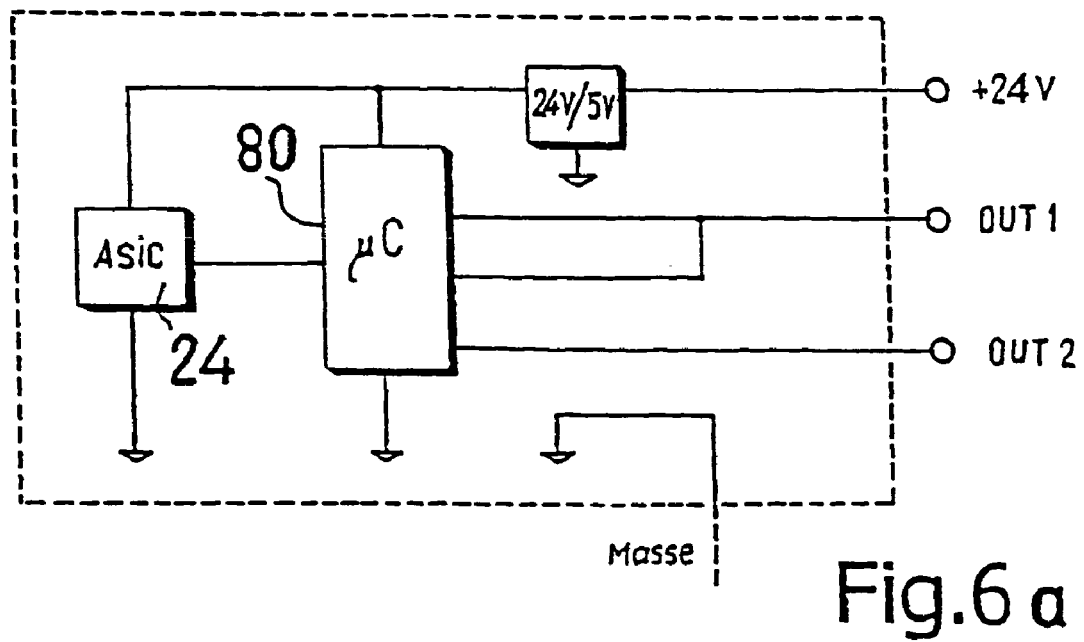
FIG. 6a shows a concept circuit diagram of a signal-generating branch of a push-pull signal generator.

A third embodiment example per FIGS. 6a and 6b uses the ASIC 24 to generate an analog signal AN2. The analog channel here is structured the same as the analog channel per FIG. 5. For this, the terminals J1 and J3 are re-numbered as I/01 and I/03. The resistors R4, the diodes D1, and the resistors R2 are positioned in similar fashion between the ASIC 22 or 24 and the microprocessor unit 70 or 80.

An analog/digital converter 82 is provided. It is connected the same as the analog/digital converter 72. Its output 3 is similarly connected with the resistor R1, the capacitor C1, the inductor L1, the diode D2, and, instead of resistor R8, a resistor R5.

The input of the second ASIC 25 with Hall-effect device 25H is connected with an input-switching unit 83. Its output is connected with a microprocessor unit 81 whose outputs are so configured with additional components that push-pull signals G1, G2 are produced at outputs 86, 87.

The input-switching unit 83 is configured identically as the input-switching unit 76 in FIG. 5b.

For this, as described above, the terminal I/04 is connected with the inputs 1 and 3 of the ASIC 6. In front of them is a capacitor C4 that is connected with the inputs 2 and 5 of ASIC 6. The terminals 2 and 5 are grounded. An ASIC 5GS2 component and a capacitor C5 are positioned between the grounded inputs 2 and 5 and the output 4 of the ASIC 6.

The output 4 of the ASIC 6 leads from the capacitor [ASIC 3] to the input 1 of the ASIC 25 and to the input 5 of the microprocessor unit 81. A resistor R3 is positioned between the input 1 of the ASIC 25 and its output 5.

The other two inputs 2 and 3 of the ASIC 25 are grounded. A circuit of type 16105 S1 made by MELEXIS is used.

The microprocessor unit 81 is connected as follows:

The input 5 is connected with corresponding pin I/04.

The input 4 is connected with corresponding input 4 of the ASIC 25.

An output stage 85 is positioned at the output 3 that is grounded via ground point GND-A and that is fed to terminal I/6, i.e., the output 87, via a resistor R7 and an inductor L3.

Further, another output stage 84 is connected to ground at output 3. This output stage 84 is fed to Pin I/05, i.e., the output 86, via a resistor R6 and an inductor L2. Both output stages 84 and 85 are implemented a diodes D3, D4.

A capacitor C5 is positioned between the resistor R7 and the inductor L3 and connected to ground (ground, zero potential), and a capacitor 2 is positioned between the resistor R6 and the inductor L2 connected to grounding point GND-A.

Figure 11A:
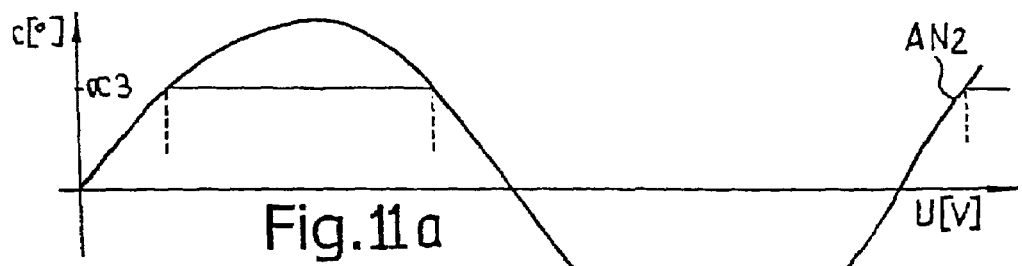
FIG. 11a, b shows balanced opposing signals produced by the push-pull signal generator per FIGS. 6a and 6b.
Figure 11B:
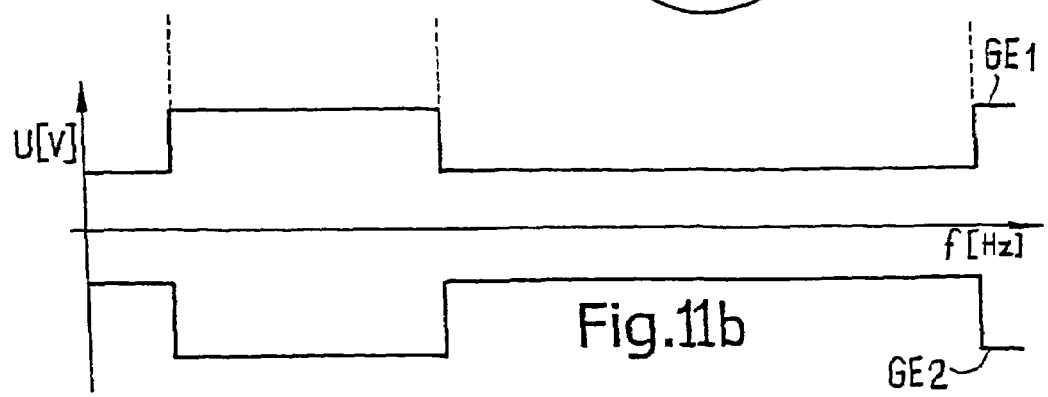

If the rotating unit of the rotational-angle sensor in this embodiment example is moved by means of the pedal element 2, the analog signal AN2 is produced from output 82', and push-pull signals G1 and G2 are produced at the two outputs 86 and 87, as FIGS. 11a and 11b show.

If the pedal element 2 assumes a pedal angle α3, the width and the positive component of the analog signal ANZ in FIG. 11a creates the length of the HIGH flank and the length of the LOW flank up to the next positive component of the ANZ by means of the controlling microprocessor unit 81 using its programming and D3 received from signal GE1. Diode D4 ensures that the push-pull signal GEZ is produced, as FIG. 11b shows.

In all three embodiment examples, a rotational-angle sensor is used that produces the signals per FIG. 7 as described above. These signals are transferred to the motor control unit, and are correspondingly evaluated for motor control. It is of particular advantage that the particularly small actuation angle of only 22° be positioned within linear sections of the ASIC output voltage $U_{AL}$. This ensures that the pulse-width-modulated signals, the analog signals, the switching signals GT, and the push-pull signals GE1 and GE2 may be reproduced with a high degree of accuracy. Even rough operation of the gas pedal in heavy vehicles does not result in errors.

Another very significant advantage is the fact that programmable units such as ASIC circuits and microprocessor units may be adjusted with the help of PIN programming via the flat plug 38 of the rotational-angle sensor. It is thus possible to adjust and set each sensor to produce the desired signals.

There has thus been shown and described a novel floor pedal with a rotation angle sensor which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Floor pedal device for heavy motor vehicles, comprising in combination:
   (a) a base plate element;
   (b) a pedal element, movably connected to the base plate element by means of a connector device such that the pedal element may be moved between an idle position and a full-throttle position of an internal combustion engine through a pedal angle (α) of between 0° and 30°;
   (c) a signal generator that is at least partially connected with the connector device and that generates a signal corresponding to pedal movement, said signal generator including a rotation angle sensor that includes at least one of (1) an ASIC circuit with a Hall device and a buffer storage circuit implemented as an E²PROM and (2) a buffer storage unit;
   (d) a microprocessor unit, connected to the ASIC circuit; and
   (e) an output switching device connected to the microprocessor unit for producing at least one pulse-width-modulated output signal (PW1, PW2) with selectable frequencies (F1, F2, F3, F4).

2. The floor pedal device according claim 1, wherein the pedal element may be moved between the idle position and the full-throttle position of an internal combustion engine through a pedal angle (α) of between 0° and 22°.

3. The floor pedal device according to claim 1, wherein the pedal element includes a return spring which returns the pedal element to the idle position, and wherein the connector device includes a separate return spring to return the rotational angle sensor to the idle position.

4. The floor pedal device according to claim 1, wherein the pedal element includes two return springs to return the pedal element to the idle position.

5. The floor pedal device according to claim 1, wherein each ASIC circuit and microprocessor unit are programmable via a connector plug of the rotational angle sensor.

6. The floor pedal device according to claim 1, wherein each microprocessor unit and associated buffer storage unit is programmable via connector plugs of the rotational angle sensor.

7. The floor pedal device according to claim 1, wherein the pedal element in the idle position subtends a floor angle β with respect to the base plate element, and the floor angle (β) minus the pedal angle (α) is equal to the final-position angle (γ) whereas, the floor angle (β) being 30°, 35°, or 40°, and the final-position angle (γ) being 13° or 23°.

8. The floor pedal device according to claim 1, wherein the ASIC circuit produces an ASIC output voltage ($U_{AS}$) with a linear section ($U_L$), the pedal angle (α) being determined by means of the linear section ($U_L$) of the ASIC output voltage as the pedal element is moved.

9. The floor pedal device according to claim 1, wherein the ASIC circuits along with the Hall devices, as well as the additional components required for generating signals are enclosed within a housing unit of the rotational angle sensor.

10. Floor pedal device for heavy motor vehicles, comprising in combination:
    (a) a base plate element;
    (b) a pedal element, movably connected to the base plate element by means of a connector device such that the pedal element may be moved between an idle position and a full-throttle position of an internal combustion engine through a pedal angle (α) of between 0° and 30°;
    (c) a signal generator that is at least partially connected with the connector device and that generates a signal corresponding to pedal movement, said signal generator including a rotation angle sensor that includes at least one ASIC circuit with a Hall device and a buffer circuit implemented as an E²PROM;
    (d) a microprocessor unit, connected to the ASIC circuit; and
    (e) a digital/analog converter connected to the microprocessor unit for producing an analog output signal.

11. The floor pedal device according claim 10, wherein the pedal element may be moved between the idle position and the full-throttle position of an internal combustion engine through a pedal angle (α) of between 0° and 22°.

12. The floor pedal device according to claim 10, wherein the pedal element includes a return spring which returns the pedal element to the idle position, and wherein the connector device includes a separate return spring to return the rotational angle sensor to the idle position.

13. The floor pedal device according to claim 10, wherein the pedal element includes two return springs to return the pedal element to the idle position.

14. The floor pedal device according to claim 10, wherein each ASIC circuit and microprocessor unit are programmable via a connector plug of the rotational angle sensor.

15. The floor pedal device according to claim 10, wherein each microprocessor unit and associated buffer storage unit is programmable via connector plugs of the rotational angle sensor.

16. The floor pedal device according to claim 10, wherein the pedal element in the idle position subtends a floor angle β with respect to the base plate element, and the floor angle (β) minus the pedal angle (α) is equal to the final-position angle (γ) whereas, the floor angle (β) being 30°, 35°, or 40°, and the final-position angle (γ) being 13° or 23°.

17. The floor pedal device according to claim 10, wherein the ASIC circuit produces an ASIC output voltage ($U_{AS}$) with a linear section ($U_L$), the pedal angle (α) being determined by means of the linear section ($U_L$) of the ASIC output voltage as the pedal element is moved.

18. The floor pedal device according to claim 10, wherein the ASIC circuits along with the Hall devices, as well as the additional components required for generating signals are enclosed within a housing unit of the rotational angle sensor.

19. Floor pedal device for heavy motor vehicles, comprising in combination:
(a) a base plate element;
(b) a pedal element, movably connected to the base plate element by means of a connector device such that the pedal element may be moved between an idle position and a full-throttle position of an internal combustion engine through a pedal angle (α) of between 0° and 30°;
(c) a signal generator that is at least partially connected with the connector device and that generates a signal corresponding to pedal movement, said signal generator including a rotation angle sensor that includes at least one ASIC circuit with a Hall device and a buffer circuit implemented as an $E^2PROM$;
(d) a microprocessor unit, connected to the ASIC circuit; and
(e) an output switching device connected to the microprocessor unit for producing a switching signal (GT).

20. The floor pedal device according claim 19, wherein the pedal element may be moved between the idle position and the full-throttle position of an internal combustion engine through a pedal angle (α) of between 0° and 22°.

21. The floor pedal device according to claim 19, wherein the pedal element includes a return spring which returns the pedal element to the idle position, and wherein the connector device includes a separate return spring to return the rotational angle sensor to the idle position.

22. The floor pedal device according to claim 19, wherein the pedal element includes two return springs to return the pedal element to the idle position.

23. The floor pedal device according to claim 19, wherein each microprocessor unit and associated buffer storage unit is programmable via connector plugs of the rotational angle sensor.

24. The floor pedal device according to claim 19, wherein the pedal element in the idle position subtends a floor angle β with respect to the base plate element, and the floor angle (β) minus the pedal angle (α) is equal to the final-position angle (γ) whereas, the floor angle (β) being 30°, 35°, or 40°, and the final-position angle (γ) being 13° or 23°.

25. The floor pedal device according to claim 19, wherein the ASIC circuit produces an ASIC output voltage ($U_{AS}$) with a linear section ($U_L$), the pedal angle (α) being determined by means of the linear section ($U_L$) of the ASIC output voltage as the pedal element is moved.

26. The floor pedal device according to claim 19, wherein the ASIC circuits along with the Hall devices, as well as the additional components required for generating signals are enclosed within a housing unit of the rotational angle sensor.

27. Floor pedal device for heavy motor vehicles, comprising in combination:
(a) a base plate element;
(b) a pedal element, movably connected to the base plate element by means of a connector device such that the pedal element may be moved between an idle position and a full-throttle position of an internal combustion engine through a pedal angle (α) of between 0° and 30°;
(c) a signal generator that is at least partially connected with the connector device and that generates a signal corresponding to pedal movement, said signal generator including a rotation angle sensor that includes at least one ASIC circuit with a Hall device and a buffer circuit implemented as an $E^2PROM$;
(d) a microprocessor unit, connected to the ASIC circuit; and
(e) first and second output stages, connected to receive first and second outputs from the microprocessor unit, respectively, for producing push-pull signals (GE1, GE2).

28. The floor pedal device according to claim 27, wherein each ASIC circuit and microprocessor unit are programmable via a connector plug of the rotational angle sensor.

29. The floor pedal device according claim 27, wherein the pedal element may be moved between the idle position and the full-throttle position of an internal combustion engine through a pedal angle (α) of between 0° and 22°.

30. The floor pedal device according to claim 27, wherein the pedal element includes a return spring which returns the pedal element to the idle position, and wherein the connector device includes a separate return spring to return the rotational angle sensor to the idle position.

31. The floor pedal device according to claim 27, wherein the pedal element includes two return springs to return the pedal element to the idle position.

32. The floor pedal device according to claim 27, wherein each ASIC circuit and microprocessor unit are programmable via a connector plug of the rotational angle sensor.

33. The floor pedal device according to claim 27, wherein each microprocessor unit and associated buffer storage unit is programmable via connector plugs of the rotational angle sensor.

34. The floor pedal device according to claim 27, wherein the pedal element in the idle position subtends a floor angle β with respect to the base plate element, and the floor angle (β) minus the pedal angle (α) is equal to the final-position angle (γ) whereas, the floor angle (β) being 30°, 35°, or 40°, and the final-position angle (γ) being 13° or 23°.

35. The floor pedal device according to claim 27, wherein the ASIC circuit produces an ASIC output voltage ($U_{AS}$) with a linear section ($U_L$), the pedal angle (α) being determined by means of the linear section ($U_L$) of the ASIC output voltage as the pedal element is moved.

36. The floor pedal device according to claim 27, wherein the ASIC circuits along with the Hall devices, as well as the additional components required for generating signals are enclosed within a housing unit of the rotational angle sensor.

37. Floor pedal device for heavy motor vehicles, comprising in combination:
    (a) a base plate element;
    (b) a pedal element, movably connected to the base plate element by means of a connector device such that the pedal element may be moved between an idle position and a full-throttle position of an internal combustion engine through a pedal angle ($\alpha$) of between 0° and 30°;
    (c) a signal generator that is at least partially connected with the connector device and that generates a signal corresponding to pedal movement, said signal generator including a rotation angle sensor that includes at least one of (1) a first ASIC circuit with a first Hall device and (2) a buffer storage unit, as well as a second ASIC circuit with a second Hall device;
    (d) a first microprocessor unit, connected to the first ASIC circuit and a second microprocessor unit, connected to said second ASIC circuit; and
    (e) a first output switching device connected to the first microprocessor unit for producing at least one pulse-width-modulated output signal (PW1, PW2) with selectable frequencies (F1, F2, F3, F4) and a second output switching device connected to the second microprocessor unit for producing a second pulse-width-modulated signal (PW2) with selectable frequencies (F1, F2, F3, F4).

38. Floor pedal device for heavy motor vehicles, comprising in combination:
    (a) a base plate element;
    (b) a pedal element, movably connected to the base plate element by means of a connector device such that the pedal element may be moved between an idle position and a full-throttle position of an internal combustion engine through a pedal angle ($\alpha$) of between 0° and 30°;
    (c) a signal generator that is at least partially connected with the connector device and that generates a signal corresponding to pedal movement, said signal generator including a rotation angle sensor that includes a first ASIC circuit with a first Hall device and a second ASIC circuit with a second Hall device;
    (d) a microprocessor unit, connected to the first ASIC circuit, a second microprocessor unit, connected to the second ASIC circuit, and
    (e) a digital/analog converter connected to the first microprocessor unit for producing an analog output signal and an output switching device connected to the second microprocessor unit for producing an output switching signal (GT).

39. Floor pedal device for heavy motor vehicles, comprising in combination:
    (a) a base plate element;
    (b) a pedal element, movably connected to the base plate element by means of a connector device such that the pedal element may be moved between an idle position and a full-throttle position of an internal combustion engine through a pedal angle ($\alpha$) of between 0° and 30°;
    (c) a signal generator that is at least partially connected with the connector device and that generates a signal corresponding to pedal movement, said signal generator including a rotation angle sensor that includes a first ASIC circuit with a first Hall device and a second ASIC circuit with a second Hall device;
    (d) a first microprocessor unit, connected to the first ASIC circuit and a second microprocessor unit connected to the second ASIC circuit; and
    (e) a digital/analog converter connected to the first microprocessor unit for producing an analog output signal and first and second output stages, connected to receive first and second outputs from the second microprocessor unit, respectively, for producing push-pull signals (GE1, GE2).

40. Floor pedal device for heavy motor vehicles, comprising in combination:
    (a) a base plate element;
    (b) a pedal element, movably connected to the base plate element by means of a connector device such that the pedal element may be moved between an idle position and a full-throttle position of an internal combustion engine through a pedal angle ($\alpha$) of between 0° and 30°;
    (c) a signal generator that is at least partially connected with the connector device and that generates a signal corresponding to pedal movement, said signal generator including a rotation angle sensor that includes at least one of (1) an ASIC circuit with a Hall device and (2) a buffer storage unit;
    (d) a microprocessor unit, connected to the ASIC circuit; and
    (e) an output switching device connected to the microprocessor unit for producing at least one pulse-width-modulated output signal (PW1, PW2) with selectable frequencies (F1, F2, F3, F4) and means for adjusting the selectable frequencies (F1, F2, F3, F4) of each pulse-width-modulated output signal (PW1, PW2) with each buffer storage unit.

* * * * *

UNITED STATES PATENT AND TRADEMARK OFFICE
CERTIFICATE OF CORRECTION

| | |
|---|---|
| PATENT NO. | : 7,212,914 B2 |
| APPLICATION NO. | : 10/529588 |
| DATED | : May 1, 2007 |
| INVENTOR(S) | : Klaus Wilczek, Guenther Abdinghoff and Christophe Henriet |

Page 1 of 1

It is certified that error appears in the above-identified patent and that said Letters Patent is hereby corrected as shown below:

COL. 12, LINE 28, "27" SHOULD BE -- 19 --.

Signed and Sealed this

Tenth Day of July, 2007

JON W. DUDAS
*Director of the United States Patent and Trademark Office*